(12) United States Patent
Osaki et al.

(10) Patent No.: US 7,765,085 B2
(45) Date of Patent: Jul. 27, 2010

(54) ROAD GRADIENT ESTIMATING SYSTEM

(75) Inventors: Shintaro Osaki, Nisshin (JP); Hiroyuki Kodama, Kariya (JP); Masayoshi Takeda, Kariya (JP); Kazunori Kadowaki, Nagoya (JP); Hajime Kumabe, Kariya (JP); Yasuhiro Nakai, Kariya (JP); Satoshi Niwa, Nagoya (JP); Syotarou Fukuda, Obu (JP)

(73) Assignees: Advics Co., Ltd., Kariya, Aichi-Pref. (JP); Denso Corporation, Kariya, Aichi-Pref. (JP)

( * ) Notice: Subject to any disclaimer, the term of this patent is extended or adjusted under 35 U.S.C. 154(b) by 178 days.

(21) Appl. No.: 12/219,303

(22) Filed: Jul. 18, 2008

(65) Prior Publication Data

US 2009/0024354 A1    Jan. 22, 2009

(30) Foreign Application Priority Data

Jul. 18, 2007    (JP)    ............................. 2007-186913

(51) Int. Cl.
*G01C 9/00*    (2006.01)
(52) U.S. Cl. ...................................... 702/154; 73/1.75
(58) Field of Classification Search ................. 702/154; 73/1.75
See application file for complete search history.

(56) References Cited

U.S. PATENT DOCUMENTS 5,200,896 A * 4/1993 Sato et al. .................... 701/70
5,631,829 A * 5/1997 Takasaki et al. ............... 701/69
6,122,585 A * 9/2000 Ono et al. ...................... 701/71
6,216,082 B1 * 4/2001 Minowa et al. ............... 701/96
6,236,915 B1 * 5/2001 Furukawa et al. ............. 701/25
6,260,935 B1 * 7/2001 Abe et al. ..................... 303/196
6,301,540 B1 * 10/2001 Kato et al. ..................... 701/71
6,305,760 B1 * 10/2001 Otake .................... 303/122.05
7,617,036 B2 * 11/2009 Tan et al. ....................... 701/70
2008/0071452 A1 * 3/2008 Tan et al. ....................... 701/70
2009/0048755 A1 * 2/2009 Tokimasa et al. ............. 701/94
2009/0309793 A1 * 12/2009 Loomis ................. 342/357.14

FOREIGN PATENT DOCUMENTS

| JP | 02-161308 | * | 6/1990 |
| JP | 2-161308 A | | 6/1990 |
| JP | 2004-325095 | * | 11/2004 |

\* cited by examiner

*Primary Examiner*—Drew A Dunn
*Assistant Examiner*—Cindy H Khuu
(74) *Attorney, Agent, or Firm*—Buchanan Ingersoll & Rooney PC

(57) ABSTRACT

An estimated gradient value of a road is calculated based on a vehicle acceleration "A" and a time varying portion "A'" of a wheel speed. In a case that an acceleration corresponding value "Ggrad0" for the estimated gradient value is not regarded as indicating an exact figure, due to influences of disturbances, the acceleration corresponding value "Ggrad0" is corrected by a limiting value for rate-of-change with regard to the road gradient depending on respective vehicle speed, and by a limiting value for the road gradient. As a result, the acceleration corresponding value "Ggrad" for the estimated gradient value can be more exactly obtained.

14 Claims, 10 Drawing Sheets

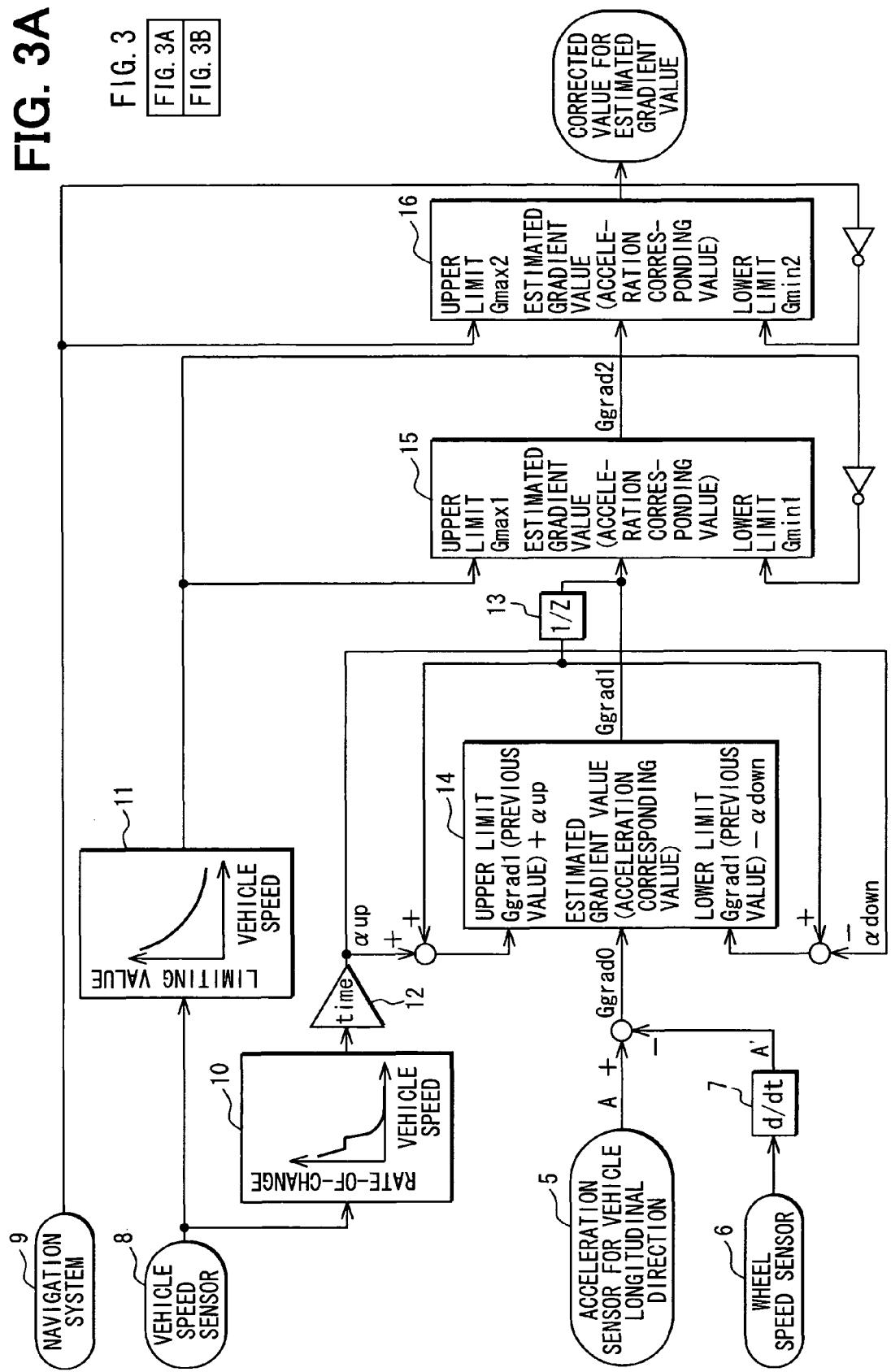

FIG. 6

| REGULATION | LEGAL SPEED +10 | REGULATION | | REGULATION | LEGAL SPEED +10 | |
|---|---|---|---|---|---|---|
| SPEED LIMIT [km/h] | [km/h] | ROAD GRADIENT (%) | ACCELERATION CORRESPONDING VALUE (G) FOR THE LIMITING VALUE WITH REGARD TO ROAD GRADIENT | CURVATURE RADIUS (m) | ANGULAR SPEED (rad/s) | ACCELERATION CORRESPONDING VALUE (G/s) FOR THE LIMITING VALUE WITH REGARD TO THE RATE-OF-CHANGE OF THE ROAD GRADIENT |
| 120 | 130 | 5 | 0.05 | 4000 | 0.009027778 | 0.009027655 |
| 100 | 110 | 6 | 0.06 | 3000 | 0.010185185 | 0.010185009 |
| 80 | 90 | 7 | 0.07 | 2000 | 0.0125 | 0.012499674 |
| 60 | 70 | 8 | 0.08 | 1000 | 0.019444444 | 0.019443219 |
| 50 | 60 | 9 | 0.09 | 700 | 0.023809524 | 0.023807274 |
| 40 | 50 | 10 | 0.1 | 450 | 0.030864198 | 0.030859298 |
| 30 | 40 | 11 | 0.11 | 250 | 0.044444444 | 0.044429814 |
| 20 | 30 | 12 | 0.12 | 100 | 0.083333333 | 0.083236916 |
| 10 | 20 | 15 | 0.15 | 40 | 0.138888889 | 0.2 |
| 0 | 10 | 20 | 0.2 | 22 | 0.126262626 | 0.2 |
| | 5 | 30 | 0.3 | 9 | 0.154320988 | 0.3 |

ROAD GRADIENT ESTIMATING SYSTEM

CROSS REFERENCE TO RELATED APPLICATION

This application is based on Japanese Patent Application No. 2007-186913 filed on Jul. 18, 2007, the disclosure of which is incorporated herein by reference.

FIELD OF THE INVENTION

The present invention relates to a road gradient estimating system for estimating road gradient (an angle of gradient) of a vehicle traveling road in a vehicle traveling direction.

BACKGROUND OF THE INVENTION

A method for estimating the road gradient is conventionally proposed, for example, as disclosed in Japanese Patent Publication No. H02-161308, according to which the road gradient is estimated based on vehicle acceleration in a vehicle longitudinal direction detected by an acceleration sensor provided on a vehicle as well as acceleration of the vehicle with respect to the road. The acceleration of the vehicle with respect to the road is, for example, acceleration for a component of gravity (which corresponds to the road gradient), which is calculated based on a time varying value (differentiated value) of a vehicle wheel speed detected by a wheel speed sensor.

More exactly, the road gradient "θ" is calculated in the following formula (1). This is based on an idea that a value subtracting a time varying portion "A'" of a wheel speed from a vehicle acceleration in the vehicle longitudinal direction corresponds to the acceleration for the component of gravity. In the formula (1), "g" is the acceleration of gravity, and "θ" is the road gradient.

$$\theta = \sin^{-1}\{(A-A')/g\} \quad (1)$$

The road gradient thus calculated is applied to, for example, a vehicle cruise control system or a vehicle distance control system (an adaptive cruise control system), and furthermore used as a calculation parameter for braking force in a vehicle braking force control for a pre-crash system.

However, the above detected acceleration may include various kinds of disturbance parameters, such as variation of acceleration having noise generated when the vehicle climbs over a foreign substance existing on the road, variation of acceleration caused by road undulation, and soon. Accordingly, the road gradient calculated in the above manner is not always sufficiently accurate. It is, therefore, necessary to estimate the road gradient more accurately, in order to achieve optimization for a vehicle behavior control (a control for a vehicle driving force as well as a vehicle braking force).

SUMMARY OF THE INVENTION

The present invention is, therefore, made in view of the foregoing problem, and has an object to provide a road gradient estimating system, according to which the road gradient can be more accurately estimated.

According to a feature of the present invention (road gradient estimating system), a first portion calculates a first physical amount "Ggrad0" corresponding to an estimated gradient value of a road on which a vehicle is currently traveling, based on a difference between an acceleration "A" detected by an acceleration sensor for detecting acceleration of the vehicle in a vehicle longitudinal direction and an acceleration "A'" of the vehicle with respect to the road. A second portion stores data for relation between vehicle speed and a second physical amount corresponding to a limiting value for rate-of-change of road gradient. A third portion, to which information of vehicle speed is inputted, calculates a third physical amount (αup, αdown) corresponding to the limiting value for rate-of-change of road gradient at the inputted vehicle speed, based on the relation between the vehicle speed and the second physical amount stored in the second portion.

The road gradient estimating system further has a fourth portion, which compares rate-of-change of the first physical amount "Ggrad0" corresponding to the estimated gradient value with the third physical amount (αup, αdown) corresponding to the limiting value for the rate-of-change of road gradient calculated at the third portion. The, fourth portion corrects the first physical amount "Ggrad0" corresponding to the estimated gradient value, in such a manner that the first physical amount "Ggrad0" corresponding to the estimated gradient value is limited to the limiting value for the rate-of-change of road gradient calculated at the third portion, when the rate-of-change of the first physical amount "Ggrad0" corresponding to the estimated gradient value is larger than the third physical amount (αup, αdown) corresponding to the limiting value for the rate-of-change of road gradient calculated at the third portion.

As above, in the case that rate-of-change for the physical amount "Grad0" for the estimated gradient value, which is calculated by subtracting the acceleration "A'" of the vehicle with respect to the road from the vehicle acceleration "A" in the vehicle longitudinal direction, is not regarded as indicating an exact figure due to influences of parameters for disturbance, a limit is set to the physical amount, wherein the limit is set to the rate-of-change for the road gradient depending on the vehicle speed. As a result, it is possible to obtain the physical amount exactly corresponding to the estimated gradient value, namely, to more exactly estimate the road gradient when compared with the conventional method.

According to another feature of the present invention, the fourth portion compares the first physical amount "Ggrad0" calculated by the first portion in the current calculating cycle with a first upper limit (Ggrad1+αup) and a first lower limit (Ggrad1−αdown). The first upper limit (Ggrad1+αup) is calculated by adding the third physical amount (αup) calculated at the third portion in the current calculating cycle to a first corrected value "Ggrad1", which corresponds to the first physical amount "Ggrad0" corrected in the previous calculating cycle. And the first lower limit (Ggrad1−αdown) is calculated by subtracting the third physical amount (αdown) calculated at the third portion in the current calculating cycle to the first corrected value "Ggrad1", which corresponds to the first physical amount "Ggrad0" corrected in the previous calculating cycle.

Then, the first upper limit (Ggrad1+αup) is decided as the first corrected value "Ggrad1" of the current calculating cycle, in the case that the first physical amount "Ggrad0" of the current calculating cycle is larger than the first upper limit (Ggrad1+αup). Alternatively, the first physical amount "Ggrad0" of the current calculating cycle is decided as the first corrected value "Ggrad1" of the current calculating cycle, in the case that the first physical amount "Ggrad0" of the current calculating cycle is smaller than the first upper limit (Ggrad1+αup) but larger than the first lower limit (Ggrad1−αdown), or the first lower limit (Ggrad1−αdown) is decided as the first corrected value "Ggrad1" of the current calculating cycle, in the case that the first physical amount "Ggrad0" of the current calculating cycle is smaller than the first lower limit (Ggrad1−αdown).

According to a further feature of the present invention, the second portion has a map, according to which the limiting value for the second physical amount corresponding to the rate-of-change of the road gradient becomes smaller as the vehicle speed becomes larger.

Furthermore, the second portion may have a map, according to which the limiting value for the second physical amount corresponding to the rate-of-change of the road gradient becomes smaller as the vehicle speed becomes smaller in a vehicle speed range lower than a predetermined value, and according to which the limiting value for the second physical amount corresponding to the rate-of-change of the road gradient becomes smaller as the vehicle speed becomes larger in a vehicle speed range higher than the predetermined value.

In addition, the map for the vehicle speed range, which is lower than the predetermined value, is prepared based on the rate-of-change "gdθ" of the road gradient, which is calculated by the following formula:

"$gd\theta = g\theta/t = g\theta V/L$"

wherein

"g" is acceleration of gravity,

"θ" is a permissible maximum value for the road gradient in case of the vehicle speed "V", "V" is the vehicle speed, and "L" is a wheel base of the vehicle.

According to a still further feature of the present invention, the road gradient estimating system has a fifth portion for storing data for relation between the vehicle speed and a fifth physical amount corresponding to a limiting value for the road gradient. The system further has a sixth portion, to which information of the vehicle speed is inputted, for calculating a second upper limit "Gmax1" and a second lower limit "Gmin1" for the estimated gradient value at the inputted vehicle speed, based on the relation between the vehicle speed and the fifth physical amount stored in the fifth portion. The system further has a seventh portion compares the first corrected value "Ggrad1" calculated by the fourth portion with the second upper limit "Gmax1" and the second lower limit "Gmin1".

In such a road gradient estimating system, the second upper limit "Gmax1" is decided as a second corrected value "Ggrad2" for the estimated gradient value, in the case that the first corrected value "Ggrad1" is larger than the second upper limit "Gmax1", the first corrected value "Ggrad1" is decided as the second corrected value "Ggrad2" for the estimated gradient value, in the case that the first corrected value "Ggrad1" is smaller than the second upper limit "Gmax1" but larger than the second lower limit "Gmin1", and the second lower limit "Gmin1" is decided as the second corrected value "Ggrad2" for the estimated gradient value, in the case that the first corrected value "Ggrad1" is smaller than the second lower limit "Gmin1".

As above, the limiting value for the road gradient is also taken into consideration in addition to the limiting value for the rate-of-change with regard to the road gradient depending on the vehicle speed. Accordingly, the physical amount "Ggrad2" for the estimated gradient value can be more exactly obtained.

According to a further feature of the present invention, the fifth portion may have a map, according to which the limiting value for the fifth physical amount corresponding to the road gradient becomes smaller as the vehicle speed becomes larger.

According to a still further feature of the present invention, the road gradient estimating system may have an eighth portion, to which information of road gradient memorized in a navigation system is inputted, for calculating a third upper limit "Gmax2" and a third lower limit "Gmin2" for the estimated gradient value corresponding to the inputted road gradient.

In such a road gradient estimating system, the eighth portion compares the second corrected value "Ggrad2" calculated by the seventh portion with the third upper limit "Gmax2" and the third lower limit "Gmin2". Then, the third upper limit "Gmax2" is decided as a third corrected value "Ggrad3" for the estimated gradient value, in the case that the second corrected value "Ggrad2" is larger than the third upper limit "Gmax2", or the second corrected value "Ggrad2" is decided as the third corrected value "Ggrad3" for the estimated gradient value, in the case that the second corrected value "Ggrad2" is smaller than the third upper limit "Gmax2" but larger than the third lower limit "Gmin2", or the third lower limit "Gmin2" is decided as the third corrected value "Ggrad3" for the estimated gradient value, in the case that the second corrected value "Ggrad2" is smaller than the third lower limit "Gmin2".

As above, the limiting value, which will be obtained from the road gradient memorized in the navigation system, can be further taken into consideration for the purpose of correcting the physical amount "Ggrad0" corresponding to the estimated gradient value. As a result, more exact physical amount "Ggrad" for the estimated gradient value can be obtained.

According to a further feature of the present invention, the second portion may store data for relation between legal speed for the vehicle speed and the second physical amount corresponding to the limiting value for rate-of-change of road gradient, and the third portion, to which information of the legal speed memorized in a navigation system is inputted in addition to the vehicle speed, may calculate the third physical amount (αup, αdown) corresponding to the limiting value for rate-of-change of road gradient at the inputted vehicle speed, based on the relation between legal speed and the second physical amount stored in the second portion.

BRIEF DESCRIPTION OF THE DRAWINGS

The above and other objects, features and advantages of the present invention will become more apparent from the following detailed description made with reference to the accompanying drawings. In the drawings:

FIG. 3A is a block diagram schematically showing a road gradient estimating system;

FIG. 6 is a table showing the acceleration corresponding value for the limiting value with regard to rate-of-change of the road gradient as well as the acceleration corresponding value for the limiting value of the road gradient, when the vehicle runs at a speed higher than a legal speed limit (speed limit based on the road gradient) by "10 km/h";

DETAILED DESCRIPTION OF THE PREFERRED EMBODIMENTS

First Embodiment

A first embodiment of the present invention will be hereinafter explained with reference to the drawings. According to the embodiment, a road gradient estimating system of the present invention is applied to a vehicle driving/braking force control system.

Figure 1:
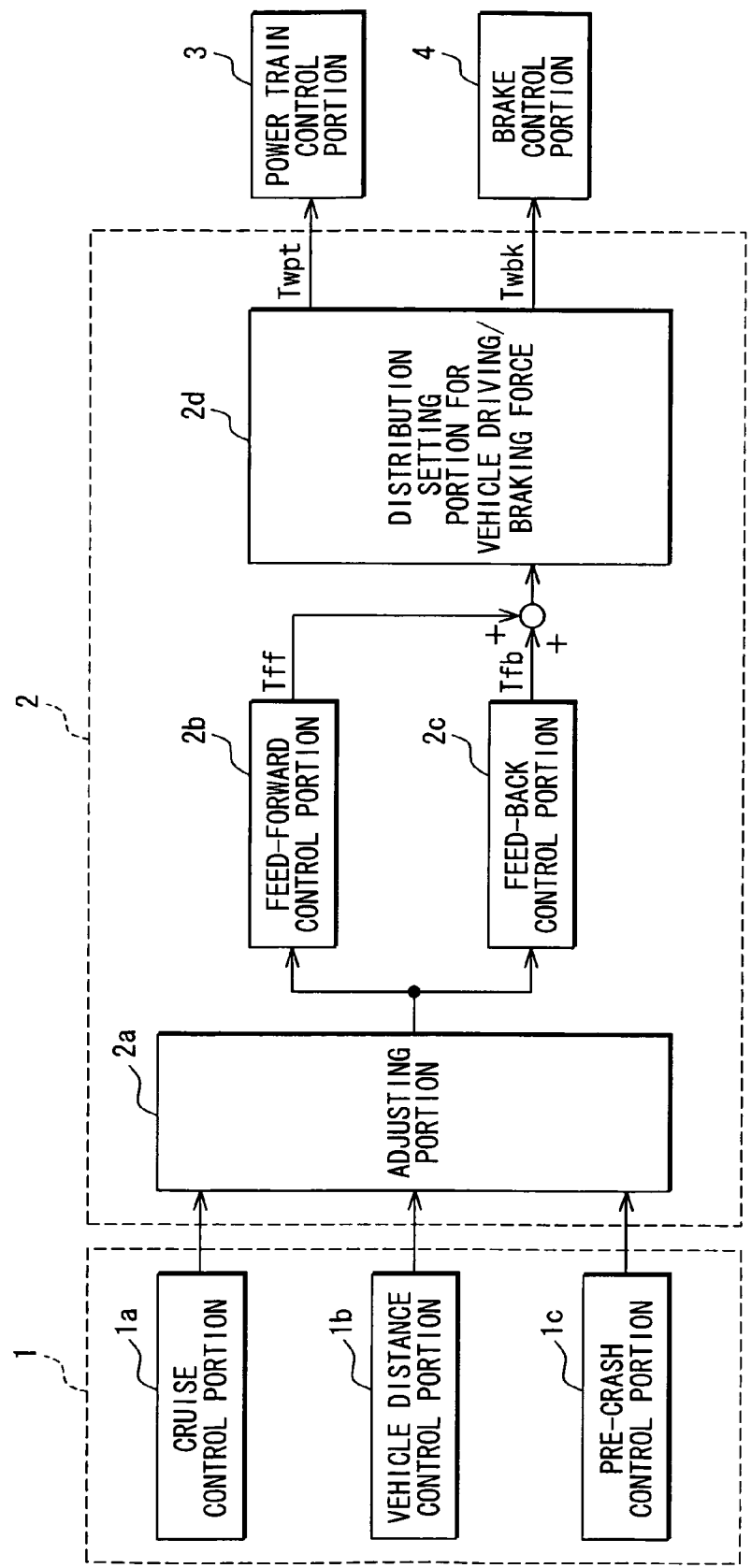
FIG. 1 is a block diagram schematically showing a vehicle driving/braking force control system according to a first embodiment of the present invention.

FIG. 1 is a block diagram schematically showing the vehicle driving/braking force control system. As shown in FIG. 1, the vehicle driving/braking force control system has an acceleration demanding portion 1, a control portion 2 for acceleration in a vehicle longitudinal direction, a power train control portion 3, and a brake control portion 4.

The acceleration demanding portion 1, which outputs an acceleration demanding signal depending on a vehicle condition, has a cruise control portion 1a, a vehicle distance control portion 1b, and a pre-crash control portion 1c. More exactly, the cruise control portion 1a outputs a demanding signal for acceleration, which is necessary to control a vehicle speed at a constant speed. The vehicle distance control portion 1b outputs a demanding signal for acceleration, which is necessary for controlling a vehicle distance to a front vehicle at a predetermined value. The pre-crash control portion 1c outputs a demanding signal for acceleration, which is necessary to avoid a crash against the front vehicle.

The control portion 2 for the acceleration in the vehicle longitudinal direction has an adjusting portion 2a, a feed-forward control portion 2b, a feed-back control portion 2c, and a distribution setting portion 2d for vehicle driving/braking force. The adjusting portion 2a adjusts acceleration demanded by the demanding signals from the acceleration demanding portion 1, and outputs a varying amount for the demanded value of the acceleration in one control cycle.

The feed-forward control portion 2b carries out a feed-forward control, so that an actual vehicle acceleration (hereinafter, also referred to as an actual acceleration) is controlled to be a demanded value for the acceleration, which is outputted from the adjusting portion 2a. According to the present embodiment, a road gradient estimating system is provided in the feed-forward control portion 2b. The feed-forward control portion 2b compensates for various kinds of disturbance parameters, which are supposed to be variation factors for the vehicle acceleration. An influence by the road gradient is considered as one of the variation factors. In the case that the influence by the road gradient is compensated (compensation for grade resistance), an estimated value for the road gradient is calculated (hereinafter, also referred to as an estimated gradient value).

Figure 2:
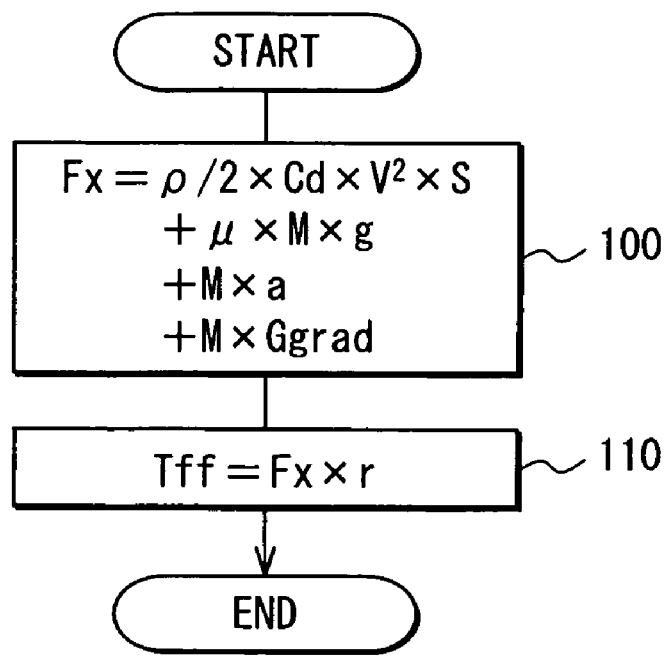
FIG. 2 is a flowchart showing a process for carrying out calculation of a wheel shaft torque, which is performed in a feed-forward control portion.

FIG. 2 is a flowchart showing a process for carrying out calculation of a wheel shaft torque, which is performed in the feed-forward control portion 2b. As shown in FIG. 2, the feed-forward control portion 2b at first calculates at a step 100 a feed-forward force "Fx". The feed-forward force is calculated as a value, for which the following compensation amounts are added:

an air resistance compensation amount "$\rho/2 \times Cd \times V^2 \times S$";
a rolling resistance compensation amount "$\mu \times M \times g$";
an acceleration compensation amount "$M \times a$"; and
a grade resistance compensation amount "$M \times Ggrad$".

In the above formulas, "$\rho$" is an air resistance, "Cd" is a coefficient of the air resistance, "V" is a vehicle speed, "r" is a wheel radius, "S" is a frontal projected area, "$\mu$" is a coefficient of the rolling resistance, "M" is a vehicle weight, "a" is a vehicle acceleration, and "Ggrad" is an acceleration corresponding value for the estimated gradient value. Then, at a step 110, the feed-forward control portion 2b calculates a wheel-shaft torque corresponding value "Tff" for the feed-forward force "Fx". The wheel-shaft torque corresponding value "Tff" can be calculated in such a way that a multiplication of the feed-forward force "Fx" and the wheel radius "r" is done.

According to the present embodiment, the estimated gradient value, among the above various compensation amounts, is calculated more accurately (explained below more in detail). As the method for calculating the above other compensation amounts is known in the art, the detailed explanation is omitted here.

The feed-back control portion 2c carries out a feed-back control based on the demanded value for the acceleration, which is outputted from the adjusting portion 2a. More exactly, a reference model is calculated based on the demanded value for the acceleration outputted from the adjusting portion 2a, a feed-back force is calculated so that a deviation between the actual acceleration and the reference model becomes zero, and a wheel-shaft torque corresponding value "Tfb" for the feed-back force is outputted.

The distribution setting portion 2d for the vehicle driving/braking force sets a distribution for the vehicle driving/braking force, which will be actually outputted, based on an added amount of the wheel-shaft torque corresponding value "Tff" for the feed-forward force "Fx" outputted from the feed-forward control portion 2b and the wheel-shaft torque corresponding value "Tfb" for the feed-back force outputted from the feed-back control portion 2c. Such distribution is transmitted to the power train control portion 3 and the brake control portion 4, respectively, as a demanded power train torque "Twpt" and a demanded brake torque "Twbk".

The power train control portion 3 outputs, based on the demanded power train torque "Twpt", a torque demanding value (a demanded engine torque) to an engine, a gear-ratio demanding value (a demanded gear-ratio) to an automatic transmission device. The brake control portion 4 outputs, based on the demanded brake torque "Twbk", a demanding value for a wheel cylinder pressure which is generated by an actuator for a brake control operation. As above, the driving force and the braking force are generated depending on the distribution for the vehicle driving/braking force, so that a desired acceleration can be obtained.

Figure 3B:
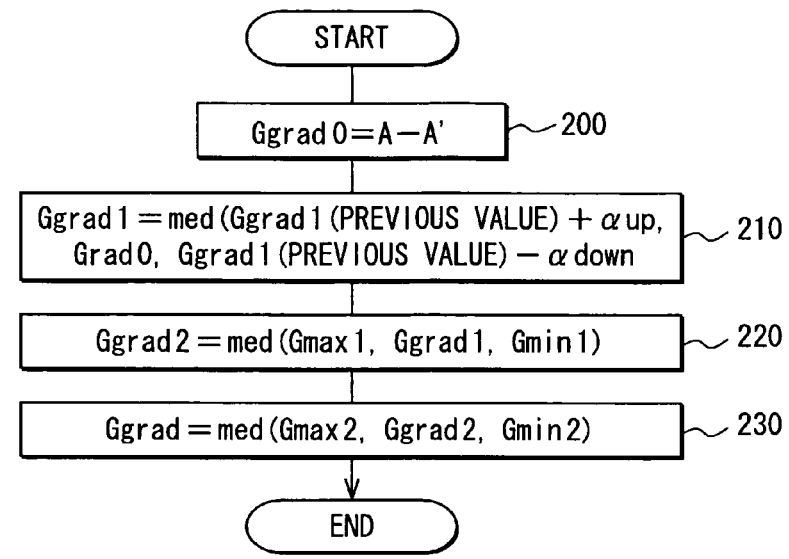
FIG. 3B is a flowchart showing a process for estimating the road gradient, which is performed by the road gradient estimating system.

Now, a detailed structure for the road gradient estimating system, which is provided in the feed-forward control portion 2b of the above vehicle driving/braking control system, will be explained with reference to FIG. 3A showing the block diagram for the road gradient estimating system, as well as FIG. 3B showing the flowchart for a process for estimating the road gradient, which is performed by the road gradient estimating system.

As shown in FIGS. 3A and 3B, the road gradient estimating system calculates at first (at a step 200) an acceleration corresponding value "Ggrad0" for the estimated gradient value in a conventional manner. Then, the road gradient estimating system compares (at a step 210) the acceleration corresponding value "Ggrad0" with acceleration corresponding values for an upper limit and a lower limit of an estimated gradient value, which is decided by a limiting value for rate-of-change of the road gradient. In addition, the road gradient estimating system compares (at a step 220) the acceleration corresponding value "Ggrad0" with acceleration corresponding values for an upper limit and a lower limit of an estimated gradient value, which is decided by a limiting value for the road gradient itself. Furthermore, the road gradient estimating system compares (at a step 230) the acceleration corresponding value "Ggrad0" with acceleration corresponding values for an upper limit and a lower limit of an estimated gradient value, which is decided by a limiting value for the road gradient memorized in a navigation system 9 as road information. The road gradient estimating system corrects the acceleration corresponding value "Ggrad0" for the estimated gradient value through the above comparison, to obtain a corrected acceleration corresponding value "Ggrad".

More exactly, a differentiated value obtained by differentiating a sensor output from a wheel speed sensor 6 at a differential circuit portion 7, namely a time varying portion "A'" (differentiated value) for wheel speed, is subtracted from a sensor output "A" from an acceleration sensor 5 for detecting acceleration in a vehicle longitudinal direction. This process is carried out at the step 200 in the conventional manner. The estimated gradient value "θ" is obtained by the above mentioned formula (1), into which the sensor output "A" from the acceleration sensor 5 and the time varying portion "A'" of the wheel speed are substituted. Accordingly, a value, which is obtained by subtracting the time varying portion "A'" of the wheel speed from the sensor output "A" from the acceleration sensor 5, is the acceleration corresponding value "Ggrad0" for the estimated gradient value "θ".

Then, a rate-of-change calculating portion 10 calculates an acceleration corresponding value for a limiting value with regard to rate-of-change for the road gradient, based on vehicle speed indicated by a sensor output from a vehicle speed sensor 8. A limiting value calculating portion 11 calculates an acceleration corresponding value for a limiting value with regard to the road gradient.

The vehicle speed must not always be obtained from the sensor output from the vehicle speed sensor 8. The vehicle speed may be calculated in another well-known manner, according to which the sensor output from the wheel speed sensor is inputted and the vehicle speed is calculated from such wheel speed. In the case that another ECU (an electronic control unit) mounted in a vehicle has already data for calculated vehicle speed, such vehicle speed may be inputted to the feed-forward control portion 2b.

A map, which shows a relation between the vehicle speed and the acceleration corresponding value for the limiting value with regard to the rate-of-change for the road gradient, is stored in the rate-of-change calculating portion 10. Therefore, the acceleration corresponding value for the limiting value with regard to the rate-of-change for the road gradient is calculated from the map.

In a similar manner, a map, which shows a relation between the vehicle speed and the acceleration corresponding value for the limiting value with regard to the road gradient, is stored in the limiting value calculating portion 11. Therefore, the acceleration corresponding value for the limiting value with regard to the road gradient is calculated from the map.

Figure 4:
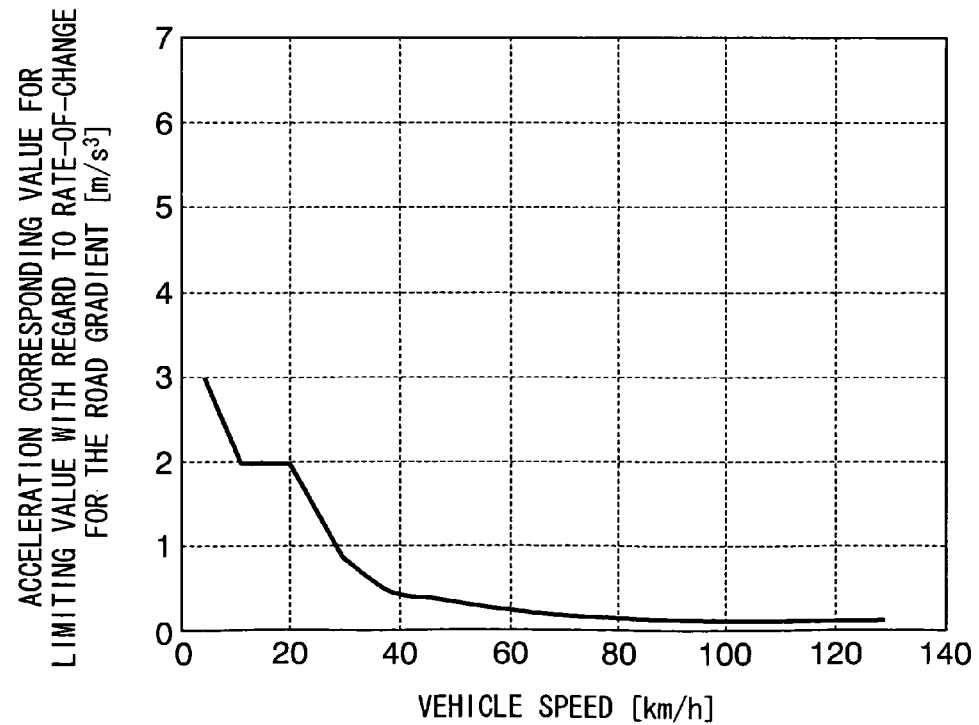
FIG. 4 is an enlarged map showing a relation between a vehicle speed and an acceleration corresponding value for a limiting value with regard to rate-of-change for the road gradient.
Figure 5:
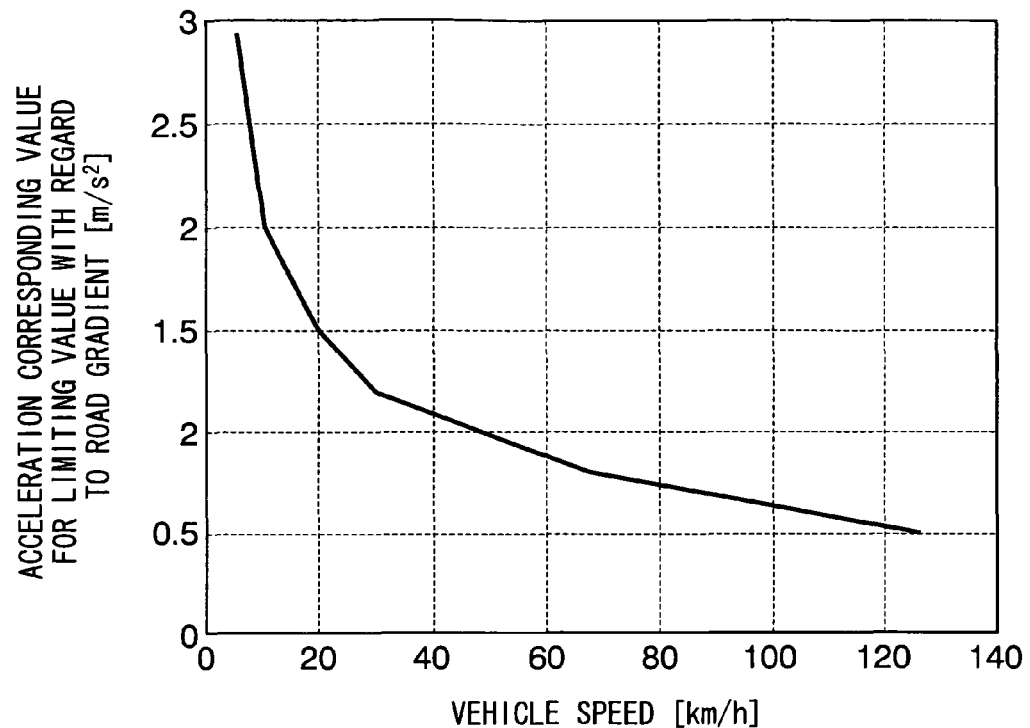
FIG. 5 is an enlarged map showing a relation between a vehicle speed and a acceleration corresponding value for a limiting value of the road gradient.

FIG. 4 is an enlarged map, which is stored in the rate-of-change calculating portion 10 and which shows the relation between the vehicle speed and the acceleration corresponding value for the limiting value with regard to the rate-of-change for the road gradient. And FIG. 5 is an enlarged map, which is stored in the limiting value calculating portion 11 and which shows the relation between the vehicle speed and the acceleration corresponding value for the limiting value with regard to the road gradient.

A favorable relation between the vehicle speed and the rate-of-change for the road gradient, as well as a favorable relation between the vehicle speed and the limiting value for the road gradient, may be in advance decided. According to a government decree for road structure, a road gradient and a curvature radius are regulated for respective speed limits, and the roads are constructed in accordance with the government decree for road structure.

The acceleration corresponding values for limiting values with regard to the rate-of-change for the road gradient, as well as the acceleration corresponding values for limiting values with regard to the road gradient itself, can be indicated as shown in the table of FIG. 6, wherein it is supposed that the vehicle travels on a road having a road gradient corresponding to each speed limit and at a speed higher than such speed limit by "10 km/h". However, the government decree for the road structure does not regulate road gradient and a curvature radius for such cases in which legal speed limit is lower than 20 km/h. Therefore, in FIG. 6, the road gradients as well as curvature radius are supplemented for the cases of vehicle speed lower than 20 km/h, through extrapolation method based on the road gradients as well as curvature radius for the cases of the vehicle speed larger than 20 km/h.

As above, in the case that the relation between the vehicle speed and the rate-of-change for the road gradient, as well as the relation between the vehicle speed and the limiting value for the road gradient, is in advance decided, a map for showing the relation between the vehicle speed and the acceleration corresponding value for the limiting value with regard to rate-of-change for the road gradient, or a map for showing the relation between the vehicle speed and the acceleration corresponding value for the limiting value with regard to the road gradient, can be made.

Accordingly, as shown in FIG. 4, such a map can be made, according to which the vehicle can cope with a rapid change of the road gradient, wherein the limiting value for the road gradient can be larger as the vehicle speed becomes lower. In other words, the vehicle can not cope with the rapid change of the road gradient, as the vehicle speed becomes higher. In the similar manner, such a map as shown in FIG. 5 can be made, according to which the vehicle can cope with a rapid change of the road gradient, wherein the limiting value for the road gradient can be larger as the vehicle speed becomes lower.

Namely, the vehicle can not cope with the rapid change of the road gradient, as the vehicle speed becomes higher.

Then, a sampling portion 12 outputs the acceleration corresponding value for the limiting value with regard to the rate-of-change, which is calculated by the rate-of-change calculating portion 10, as an acceleration corresponding value for the limiting value for a current calculating cycle. This acceleration corresponding value for the limiting value of the current calculating cycle is added to an acceleration corresponding value "Ggrad1" (a previous value) for a previous value of the estimated gradient value (a first estimated gradient value), which is stored in a memory 13 for the previous value. As a result, the acceleration corresponding value "Ggrad1+αup" for the upper limit of the road gradient is calculated, wherein the rate-of-change for the road gradient is taken into account. On the other hand, when the acceleration corresponding value for the limiting value of the current calculating cycle is subtracted from the acceleration corresponding value "Ggrad1", the acceleration corresponding value "Ggrad1−αdown" for the lower limit of the road gradient is calculated, wherein the rate-of-change for the road gradient is taken into account.

A first comparing portion 14 compares the above acceleration corresponding value "Ggrad1+αup" for the upper limit of the road gradient and the acceleration corresponding value "Ggrad1−αdown" for the lower limit of the road gradient with the acceleration corresponding value "Ggrad0" for the estimated gradient value calculated in the conventional manner. An intermediate value through the above comparison will be decided (the step 210) as a corrected acceleration corresponding value "Ggrad1" for the estimated gradient value, wherein the rate-of-change for the road gradient is taken into account.

The upper limit as well as the lower limit for the road gradient, for which the rate-of-change for the road gradient is taken into account, is a limiting value assumed from the government decree for road structure. Accordingly, in the case that the estimated gradient value "θ" deviates from a range (a range defined by the upper limit and the lower limit), the estimated gradient value "θ" should be regarded as not indicating an exact value due to influences of the disturbance parameters.

Therefore, in the case that the acceleration corresponding value "Ggrad0" for the estimated gradient value becomes larger than the acceleration corresponding value "Ggrad1+αup" for the upper limit of the road gradient (for which the rate-of-change for the road gradient is taken into account), or in the case that the acceleration corresponding value "Ggrad0" for the estimated gradient value becomes smaller than the acceleration corresponding value "Ggrad1−αdown" for the lower limit of the road gradient, the acceleration corresponding value "Ggrad1+αup" for the upper limit or the acceleration corresponding value "Ggrad1−αdown" for the lower limit is decided as the corrected acceleration corresponding value "Ggrad1" for the estimated gradient value.

The acceleration corresponding value for the limiting value with regard to the road gradient, which is calculated by the limiting value calculating portion 11, is inputted to a second comparing portion 15 as an upper limit "Gmax1". And a value, in which a plus-and-minus sign is changed to the above acceleration corresponding value for the limiting value with regard to the road gradient, is inputted to the second comparing portion 15 as a lower limit "Gmin1". Then, the acceleration corresponding value "Ggrad1" for the estimated gradient value is compared at the second comparing portion 15 with the upper limit "Gmax1" and the lower limit "Gmin1". An intermediate value through the above comparison will be decided (the step 220) as a corrected acceleration corresponding value "Ggrad2" for the estimated gradient value, wherein the limiting values for the road gradient is taken into account.

The upper limit "Gmax1" as well as the lower limit "Gmin1" for the acceleration corresponding value for the road gradient, for which the limiting values for the road gradient is taken into account, is a limiting value assumed from the government decree for road structure. Accordingly, in the case that the estimated gradient value "θ" deviates from a range (a range defined by the upper limit and the lower limit), the estimated gradient value "θ" should be regarded as not indicating an exact value due to influences of the disturbance parameters.

Therefore, in the case that the acceleration corresponding value "Ggrad1" for the estimated gradient value becomes larger than the upper limit "Gmax1" of the acceleration corresponding value for the road gradient, for which the limiting values for the road gradient is taken into account, or in the case that the acceleration corresponding value "Ggrad1" for the estimated gradient value becomes smaller than the lower limit "Gmin1", the upper limit "Gmax1" or the lower limit "Gmin1" is decided as the corrected acceleration corresponding value "Ggrad2" for the estimated gradient value.

An acceleration corresponding value for the limiting value of the road gradient, which is memorized as one of road information in the navigation system 9, is inputted to a third comparing portion 16 as an upper limit "Gmax2". And a value, in which a plus-and-minus sign is changed to the above acceleration corresponding value for the limiting value of the road gradient, is inputted to the third comparing portion 16 as a lower limit "Gmin2". The road gradients memorized in the navigation system 9 correspond to respective segments of a navigation map, so that a correct road gradient corresponding to a current vehicle position can be read out from a memory.

The upper limit "Gmax2" as well as the lower limit "Gmin2" for the acceleration corresponding value are compared at the third comparing portion 16 with the corrected acceleration corresponding value "Ggrad2" for the estimated gradient value, in order to correct the acceleration corresponding value "Ggrad2" for the estimated gradient value to obtain a corrected acceleration corresponding value "Ggrad3" for the estimated gradient value (the step 230). The corrected acceleration corresponding value "Ggrad3" is decided as a final acceleration corresponding value "Ggrad" for the estimated gradient value.

As above the final (corrected) acceleration corresponding value "Ggrad" for the estimated gradient value is calculated, so that the acceleration corresponding value "Ggrad" is used for calculating the compensation for grade resistance in the feed-forward control portion 2b. As a result, the feed-forward force "Fx" is calculated. Based on this, an axle corresponding torque for distributing the driving/braking force is calculated at the distribution setting portion 2d in order to generate the driving force and/or the braking force, which corresponds to the demanded acceleration by the power train control portion 3 and/or the brake control portion 4, to realize the cruise control operation, the vehicle distance control operation, and/or the pre-crash control operation.

Figure 7:
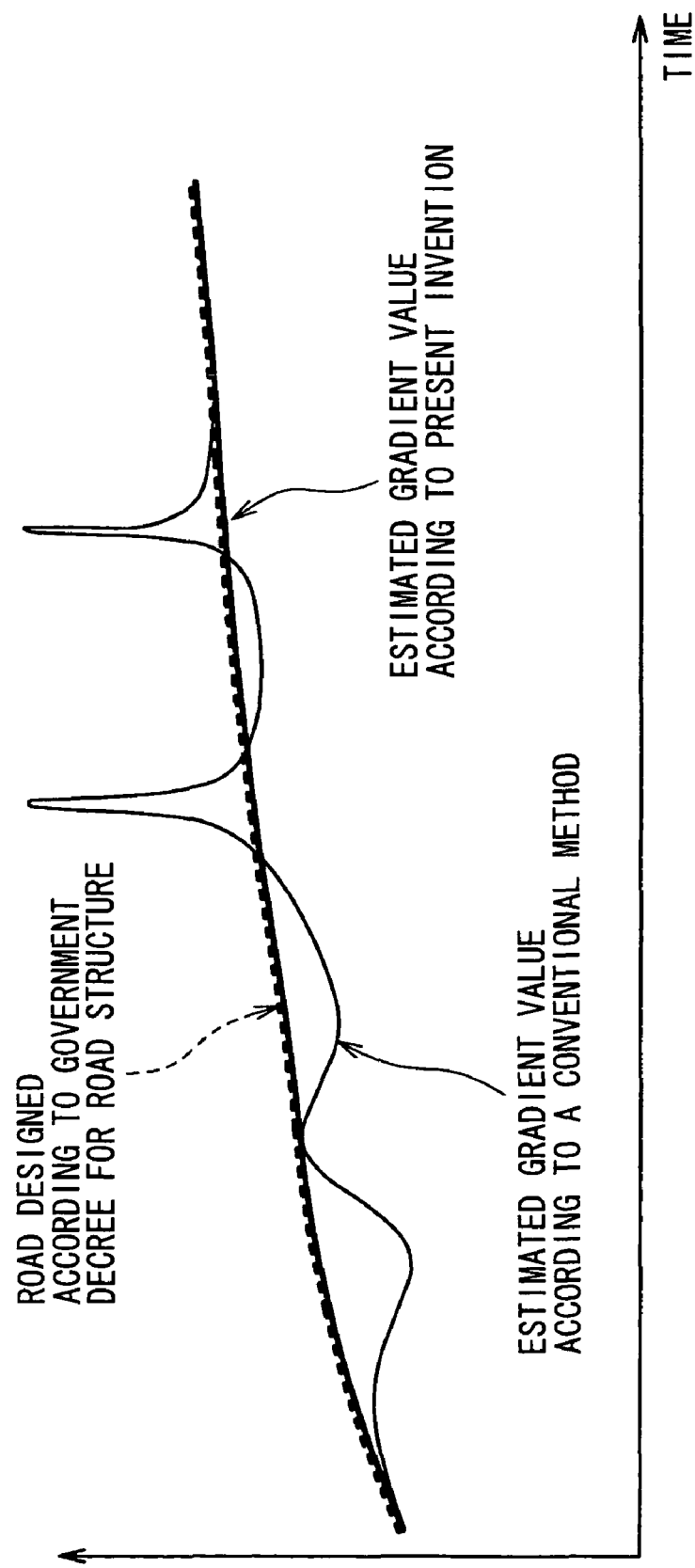
FIG. 7 is a time chart showing an actual road gradient and an estimated road gradient which is estimated in a conventional manner, and an estimated road gradient estimated according to the present invention.

As a result of investigation made by the inventors, a time chart shown in FIG. 7 is obtained, wherein the estimated gradient values, which are respectively calculated according to the conventional method and according to the present embodiment (invention), are compared with actual road gradient. As shown in FIG. 7, in the case that the noise is included in the sensor outputs from the acceleration sensor 5, the estimated gradient values calculated according to the conventional manner are influenced by the noise, such that the estimated gradient values are deviated from the road gradients, which are obtained from the government decree for road structure.

On the other hand, according to the present embodiment, the influence of the noise can be suppressed (limited), so that the estimated gradient values become to such values, which are almost equal to those obtained from the government decree for road structure.

As explained above, according to the present embodiment, the limiting value for the rate-of-change of the road gradient as well as the limiting value for the road gradient itself, which are set in accordance with the vehicle speed, are taken into account when calculating the acceleration corresponding value "Ggrad" for the estimated gradient value. Accordingly, limitations are imposed on the acceleration corresponding value "Ggrad0" for the estimated gradient value, which is calculated by subtracting the time varying portion "A'" of the wheel speed from the sensor output "A" from the acceleration sensor 5, when the acceleration corresponding value "Ggrad0" is not considered as indicating the exact value due to influences of the disturbance parameters.

As a result, the acceleration corresponding value "Ggrad" for the estimated gradient value can be calculated more exactly. And it becomes possible to estimate the road gradient more exactly than the conventional manner. Therefore, more appropriate operation for the cruise control, the vehicle distance control, and/or the pre-crash control can be realized based on the above acceleration corresponding value "Ggrad" for the estimated gradient value, which is more exactly calculated.

Second Embodiment

A second embodiment of the present invention will be explained. According to the second embodiment, a map for setting the limiting value with regard to the rate-of-change of the road gradient is changed, which differs from the first embodiment. The remaining portions are the same to the first embodiment. Therefore, a different portion will be explained.

Figure 8:
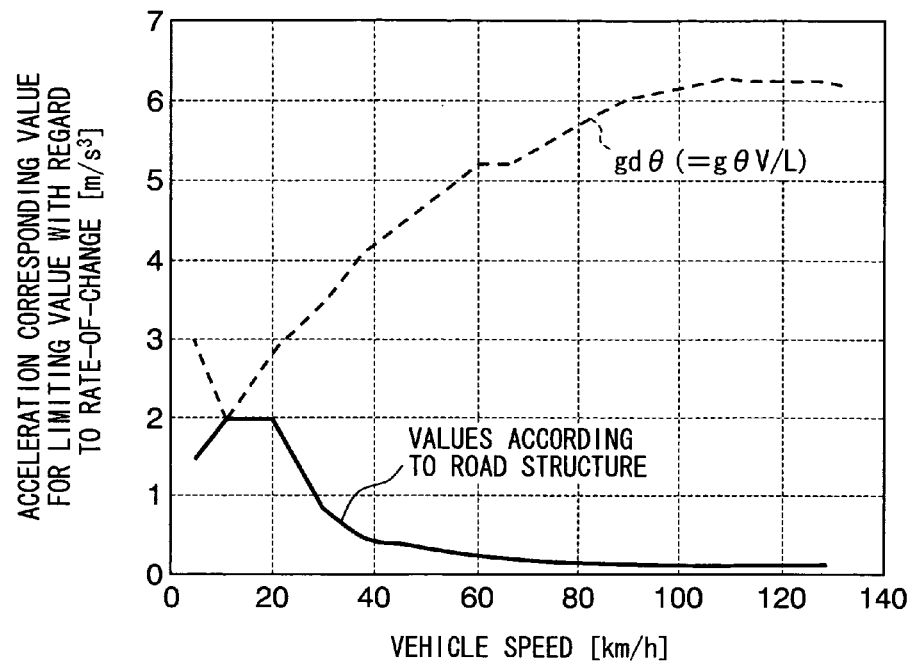
FIG. 8 is an enlarged map showing a relation between a vehicle speed and an acceleration corresponding value for a limiting value with regard to rate-of-change of the road gradient, according to a second embodiment of the present invention.

FIG. 8 is an enlarged map showing a relation between the vehicle speed and the acceleration corresponding value for the limiting value with regard to the rate-of-change for the road gradient, which is memorized in the rate-of-change calculating portion 10. As shown in FIG. 8, a map for a range of vehicle low speed is added to the map shown in FIG. 4.

When the vehicle starts to move on an uphill slope (or a downhill slope) having a road gradient "θ", angle of vehicle inclination will be changed during a period from a starting point of a front wheel (the front wheel starts to go up or go down the slope) to an ending point of a rear wheel (the rear wheel starts to go up or go down the slope). The above change for the angle of vehicle inclination is taken into account in the map. More detailed explanation will be made with reference to FIG. 9.

Figure 9:
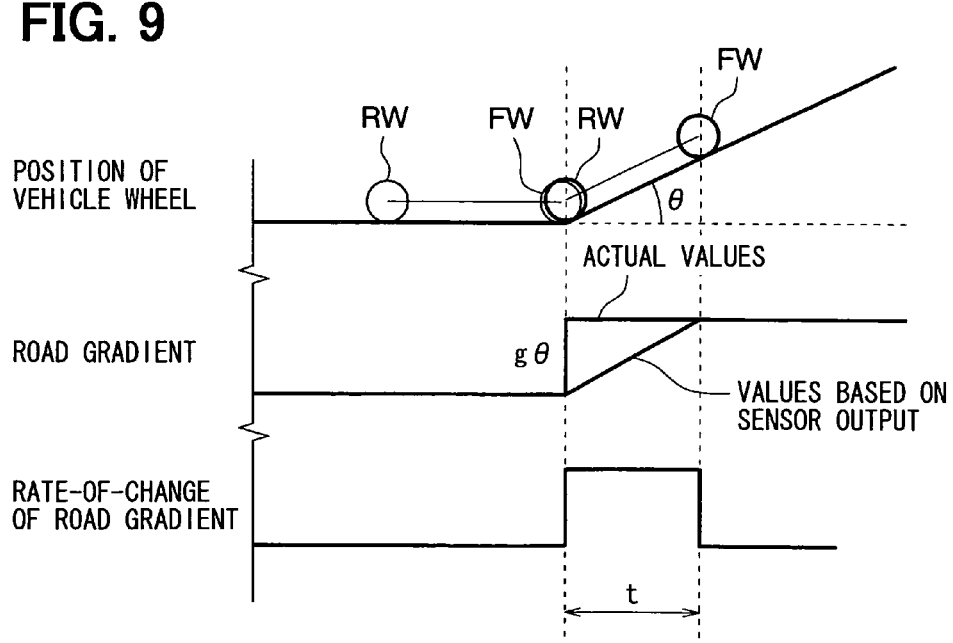
FIG. 9 is a time chart showing estimated road gradient, which is calculated based on respective wheel positions of a front wheel and a rear wheel when the vehicle climbs up a sloping road, and rate-of-change of the road gradient.

FIG. 9 is a time chart showing how the estimated gradient value and the rate-of-change of the road gradient are changed in accordance with positions of the front and rear wheels "FW, RW" of the vehicle traveling on the slope having the road gradient "θ".

When the front wheels "FW" and the rear wheels "RW" have completely moved onto the slope, the estimated gradient value indicates the road gradient of the slope. However, the vehicle is not inclined to such angle corresponding to the road gradient, during the period from the starting point of the front wheel "FW" to the ending point of the rear wheel "RW". Accordingly, during the above period, the rate-of-change of the road gradient does not become such values decided by the government decree for road structure. The rate-of-change of the road gradient during the above period can be calculated from the vehicle speed and a distance between the front wheel "FW" and the rear wheel "RW", namely from the vehicle speed "V" and a wheel base "L", which are indicated by the following formulas:

$$t = L/V \tag{2}$$

The rate-of-change "gdθ" of the road gradient is indicated by the following formula. If the road gradient "θ" is a permissible maximum value for the road gradient (a permissible maximum gradient) in case of the vehicle speed "V", the rate-of-change "gdθ" of the road gradient corresponds to a maximum value for the rate-of-change of the road gradient.

$$gd\theta = g\theta/t = g\theta V/L \tag{3}$$

As understood from the formula (3), the rate-of-change "gdθ" of the road gradient becomes smaller, as the vehicle speed is lower. When the vehicle speed is lower than a predetermined value, the maximum value for the rate-of-change "gdθ" of the road gradient becomes lower than the limiting value for the rate-of-change of the road gradient (which is decided in the government decree for road structure, etc). Accordingly, the maximum value for the rate-of-change of the road gradient, which is the value for the case of the vehicle going up or going down on the slope having the road gradient "θ", is used as the limiting value for the rate-of-change of the road gradient.

When the vehicle speed is higher than the predetermined value, the maximum value for the rate-of-change "gdθ" of the road gradient becomes larger than the limiting value for the rate-of-change of the road gradient (which is decided in the government decree for road structure, etc). Therefore, after the vehicle speed has reached at the predetermined value, the limiting value for the rate-of-change of the road gradient, which is decided in the government decree for road structure, will be used.

As above, the map for the acceleration corresponding value for the limiting value with regard to the rate-of-change of the road gradient is prepared, wherein the maximum value for the rate-of-change of the road gradient in case of the vehicle going up or down on the slope of the road gradient "θ" is taken into account. As a result, the acceleration corresponding value "Ggrad" for the estimated gradient value can be more exactly obtained.

Third Embodiment

A third embodiment of the present invention will be explained. According to the third embodiment, manners for setting the limiting value for the rate-of-change of the road gradient and limiting value for the road gradient are changed from the first embodiment. The remaining portions are the same to the first embodiment. Therefore, a different portion will be explained.

Figure 10:
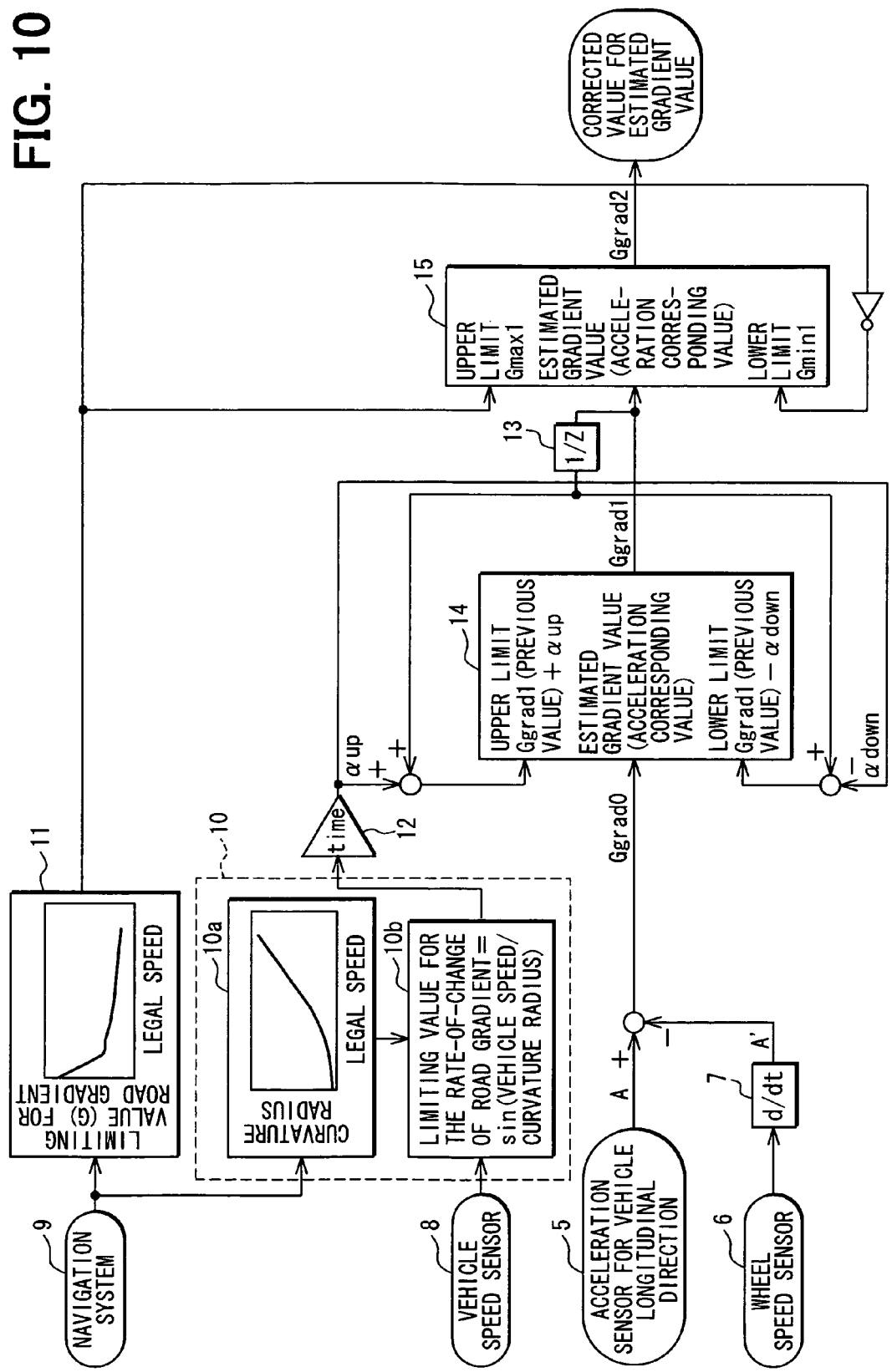
FIG. 10 is a block diagram schematically showing a road gradient estimating system according to a third embodiment of the present invention.

FIG. 10 is a block diagram schematically showing a road gradient estimating system according to the third embodiment. The road gradient estimating system of this embodiment calculates the acceleration corresponding value "Ggrad0" for the estimated gradient value in the conventional manner. Then, the road gradient estimating system compares the acceleration corresponding value "Ggrad0" with acceleration corresponding values for an upper limit and/or a lower limit of the estimated gradient value, which is decided by a limiting value for rate-of-change of the road gradient or a limiting value for the road gradient. The road gradient estimating system corrects the acceleration corresponding value "Ggrad0" for the estimated gradient value through the above comparison, to obtain a corrected acceleration corresponding value "Ggrad".

More exactly, as in the same manner to the first embodiment, the road gradient estimating system calculates the acceleration corresponding value "Ggrad0" for the estimated gradient value "θ" in the conventional manner. Then, the road gradient estimating system calculates, at a rate-of-change calculating portion 10, the acceleration corresponding value for the limiting value with regard to the road gradient based on the vehicle speed obtained from the output of the vehicle speed sensor 8 as well as the road information stored in the navigation system 9. Furthermore, the road gradient estimating system calculates, at a limiting value calculating portion 11, the acceleration corresponding value for the limiting value with regard to the road gradient, based on legal speed (legal speed limit) for respective predetermined zones memorized in the navigation system 9 as the road information.

For the purpose of calculating the acceleration corresponding value for the limiting value with regard to the road gradient, the rate-of-change calculating portion 10 has a curvature radius calculating portion 10a, which memorizes a map for showing curvature radius for such a road corresponding to the legal speed. The rate-of-change calculating portion 10 picks up a legal speed corresponding to the road on which the vehicle is presently traveling, from the road information stored in the navigation system 9. Then, the rate-of-change calculating portion 10 obtains the curvature radius of the road (on which the vehicle is presently traveling), from the above map.

A limiting value calculating portion 10b calculates the limiting value for the rate-of-change of the road gradient in accordance with the following formula, in which current vehicle speed and the curvature radius of the road are substituted.

$$\text{"the limiting value for the rate-of-change of the road gradient"} = \sin(\text{the vehicle speed/the curvature radius}) \quad (4)$$

The limiting value calculating portion 11 memorizes a map for showing a relation between the legal speed and the acceleration corresponding value for the limiting value with regard to the road gradient, so that the limiting value calculating portion 11 can calculates the acceleration corresponding value for the limiting value with regard to the road gradient based on the map.

Figure 11:
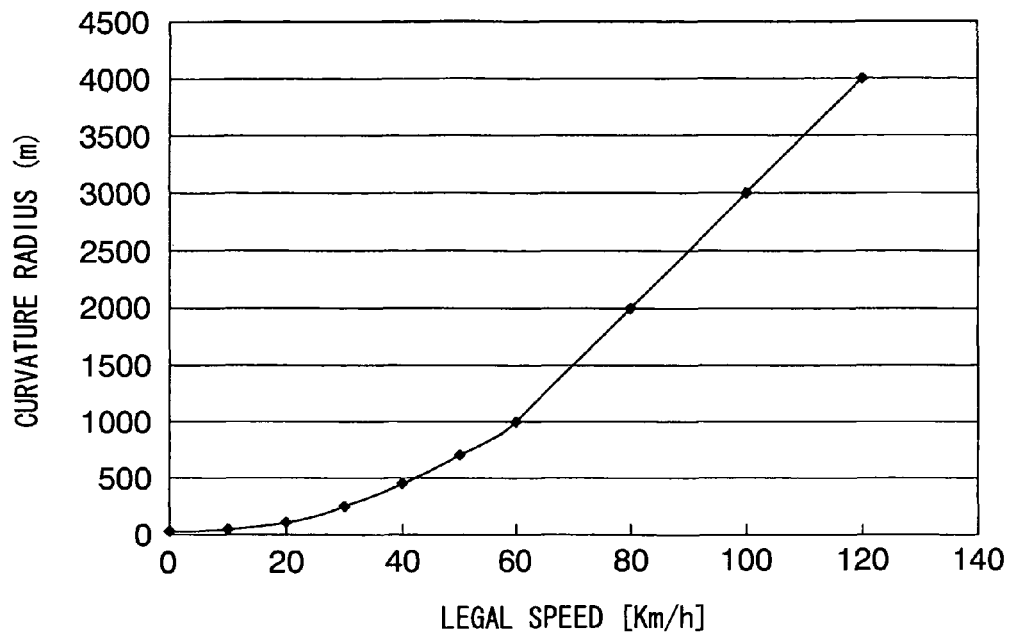
FIG. 11 is an enlarged map showing a relation between a legal speed and a curvature radius, which is stored in a curvature radius calculating portion provided in a rate-of-change calculating portion.
Figure 12:
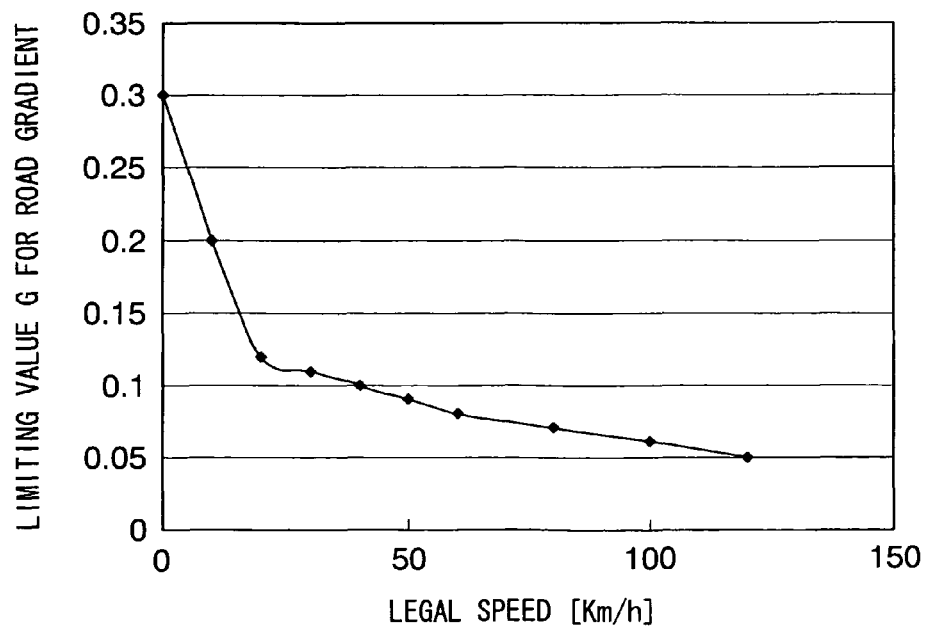
FIG. 12 is an enlarged map showing a relation between the legal speed and the acceleration corresponding value for the limiting value with regard to the road gradient, which is stored in a limiting value calculating portion.

FIG. 11 is an enlarged map showing a relation between the legal speed and the curvature radius, which is stored in the curvature radius calculating portion 10a provided in the rate-of-change calculating portion 10. And FIG. 12 is an enlarged map showing a relation between the legal speed and the acceleration corresponding value for the limiting value with regard to the road gradient, which is stored in the limiting value calculating portion 11.

A favorable relation between the curvature radius of the road and the limiting value for the road gradient may be in advance decided. For example, the road gradient and the curvature radius corresponding to the legal speed are decided in the government decree for road structure, in accordance with which the roads are constructed.

Accordingly, in the case that the relation between the vehicle speed and the curvature radius of the road, or the relation between the vehicle speed and the limiting value for the road gradient, is decided in advance, the map for the relation between the vehicle speed and the curvature radius of the road or the map for the relation between the vehicle speed and the limiting value for the road gradient can be made.

Therefore, the map can be made as shown in FIG. 11, which shows that the vehicle can respond to a smaller curvature radius when the legal speed becomes lower, whereas the vehicle can not respond to the smaller curvature radius when the legal speed becomes higher. In the similar manner, as shown in FIG. 12, the vehicle can respond to a steep slope when the legal speed becomes lower, whereas the vehicle can not respond to the steep slope when the legal speed becomes higher.

Other Embodiments

According to the above first and second embodiments, the final and corrected acceleration corresponding value "Ggrad" for the estimated gradient value is calculated, after all of the limiting value for the rate-of-change of the road gradient, the limiting value for the road gradient, and the road gradient memorized in the navigation system 9 are taken into account. However, the acceleration corresponding value "Ggrad" for the estimated gradient value can be calculated, in which not all of the above parameters but one or two parameters may be taken into account.

According to the above first and second embodiments, not the estimated gradient value but the acceleration corresponding values are calculated, so that the acceleration corresponding values are finally used for the power train control portion 3 and the brake control portion 4. However, the estimated gradient value may be directly calculated.

What is claimed is:

1. A road gradient estimating system comprising:
    a first portion for calculating a first physical amount "Ggrad0" corresponding to an estimated gradient value of a road on which a vehicle is currently traveling, based on a difference between an acceleration "A" detected by an acceleration sensor for detecting acceleration of the vehicle in a vehicle longitudinal direction and an acceleration "A'" of the vehicle with respect to the road;
    a second portion for storing data for relation between vehicle speed and a second physical amount corresponding to a limiting value for rate-of-change of road gradient;
    a third portion, to which information of vehicle speed is inputted, for calculating a third physical amount (αup, αdown) corresponding to the limiting value for rate-of-change of road gradient at the inputted vehicle speed, based on the relation between the vehicle speed and the second physical amount stored in the second portion; and
    a fourth portion for comparing rate-of-change of the first physical amount "Ggrad0" corresponding to the estimated gradient value with the third physical amount (αup, αdown) corresponding to the limiting value for the rate-of-change of road gradient calculated at the third portion,
    wherein the fourth portion corrects the first physical amount "Ggrad0" corresponding to the estimated gradient value, in such a manner that the first physical amount "Ggrad0" corresponding to the estimated gradient value is limited to the limiting value for the rate-of-change of road gradient calculated at the third portion, when the rate-of-change of the first physical amount "Ggrad0" corresponding to the estimated gradient value is larger than the third physical amount (αup, αdown) corresponding to the limiting value for the rate-of-change of road gradient calculated at the third portion.

2. The road gradient estimating system according to the claim 1, wherein operations of the first to fourth portions are repeatedly carried out for a predetermined calculating cycle, the fourth portion compares the first physical amount "Ggrad0" calculated by the first portion in the current calculating cycle with a first upper limit (Ggrad1+αup) and a first lower limit (Ggrad1−αdown), wherein the first upper limit (Ggrad1+αup) is calculated by adding the third physical amount (αup) calculated at the third portion in the current calculating cycle to a first corrected value "Ggrad1", which corresponds to the first physical amount "Ggrad0" corrected in the previous calculating cycle, wherein the first lower limit (Ggrad1−αdown) is calculated by subtracting the third physical amount (αdown) calculated at the third portion in the current calculating cycle to the first corrected value "Ggrad1", which corresponds to the first physical amount "Ggrad0" corrected in the previous calculating cycle, wherein the first upper limit (Ggrad1+αup) is decided as the first corrected value "Ggrad1" of the current calculating cycle, in the case that the first physical amount "Ggrad0" of the current calculating cycle is larger than the first upper limit (Ggrad1+αup), wherein the first physical amount "Ggrad0" of the current calculating cycle is decided as the first corrected value "Ggrad1" of the current calculating cycle, in the case that the first physical amount "Ggrad0" of the current calculating cycle is smaller than the first upper limit (Ggrad1+Cαup) but larger than the first lower limit (Ggrad1−αdown), and wherein the first lower limit (Ggrad1−αdown) is decided as the first corrected value "Ggrad1" of the current calculating cycle, in the case that the first physical amount "Ggrad0" of the current calculating cycle is smaller than the first lower limit (Ggrad1−αdown).

3. The road gradient estimating system according to the claim 1, wherein the second portion has a map, according to which the limiting value for the second physical amount corresponding to the rate-of-change of the road gradient becomes smaller as the vehicle speed becomes larger.

4. The road gradient estimating system according to the claim 1, wherein the second portion has a map, according to which the limiting value for the second physical amount corresponding to the rate-of-change of the road gradient becomes smaller as the vehicle speed becomes smaller in a vehicle speed range lower than a predetermined value, and according to which the limiting value for the second physical amount corresponding to the rate-of-change of the road gradient becomes smaller as the vehicle speed becomes larger in a vehicle speed range higher than the predetermined value.

5. The road gradient estimating system according to the claim 4, wherein the map for the vehicle speed range lower than the predetermined value is prepared based on the rate-of-change "gdθ" of the road gradient, which is calculated by the following formula:

$$gd\theta = g\theta/t = g\theta V/L$$

wherein

"g" is acceleration of gravity,

"θ" is a permissible maximum value for the road gradient in case of the vehicle speed "V", "V" is the vehicle speed, and "L" is a wheel base of the vehicle.

6. The road gradient estimating system according to the claim 1, further comprising:

a fifth portion for storing data for relation between the vehicle speed and a fifth physical amount corresponding to a limiting value for the road gradient;

a sixth portion, to which information of the vehicle speed is inputted, for calculating a second upper limit "Gmax1" and a second lower limit "Gmin1" for the estimated gradient value at the inputted vehicle speed, based on the relation between the vehicle speed and the fifth physical amount stored in the fifth portion;

a seventh portion compares the first corrected value "Ggrad1" calculated by the fourth portion with the second upper limit "Gmax1" and the second lower limit "Gmin1", wherein the second upper limit "Gmax1" is decided as a second corrected value "Ggrad2" for the estimated gradient value, in the case that the first corrected value "Ggrad1" is larger than the second upper limit "Gmax1", wherein the first corrected value "Ggrad1" is decided as the second corrected value "Ggrad2" for the estimated gradient value, in the case that the first corrected value "Ggrad1" is smaller than the second upper limit "Gmax1" but larger than the second lower limit "Gmin1", and wherein the second lower limit "Gmin1" is decided as the second corrected value "Ggrad2" for the estimated gradient value, in the case that the first corrected value "Ggrad1" is smaller than the second lower limit "Gmin1".

7. The road gradient estimating system according to the claim 6, wherein the fifth portion has a map, according to which the limiting value for the fifth physical amount corresponding to the road gradient becomes smaller as the vehicle speed becomes larger.

8. The road gradient estimating system according to the claim 6, further comprising:

an eighth portion, to which information of road gradient memorized in a navigation system is inputted, for calculating a third upper limit "Gmax2" and a third lower limit "Gmin2" for the estimated gradient value corresponding to the inputted road gradient, wherein the eighth portion compares the second corrected value "Ggrad2" calculated by the seventh portion with the third upper limit "Gmax2" and the third lower limit "Gmin2", wherein the third upper limit "Gmax2" is decided as a third corrected value "Ggrad3" for the estimated gradient value, in the case that the second corrected value "Ggrad2" is larger than the third upper limit "Gmax2", wherein the second corrected value "Ggrad2" is decided as the third corrected value "Ggrad3" for the estimated gradient value, in the case that the second corrected value "Ggrad2" is smaller than the third upper limit "Gmax2" but larger than the third lower limit "Gmin2", and wherein the third lower limit "Gmin2" is decided as the third corrected value "Ggrad3" for the estimated gradient value, in the case that the second corrected value "Ggrad2" is smaller than the third lower limit "Gmin2".

9. The road gradient estimating system according to the claim 1, wherein the second portion stores data for relation between legal speed for the vehicle speed and the second physical amount corresponding to the limiting value for rate-of-change of road gradient, and the third portion, to which information of the legal speed memorized in a navigation system is inputted in addition to the vehicle speed, calculates the third physical amount ($\alpha$up, $\alpha$down) corresponding to the limiting value for rate-of-change of road gradient at the inputted vehicle speed, based on the relation between legal speed and the second physical amount stored in the second portion.

10. A road gradient estimating system comprising:
a vehicle speed sensor mounted on a vehicle for detecting vehicle speed;
a first acceleration sensor mounted on the vehicle for detecting a first vehicle acceleration "A" in a vehicle longitudinal direction;
a second acceleration sensor mounted on the vehicle for detecting a second vehicle acceleration "A'" with respect to a road, on which the vehicle is currently traveling; and
an electronic control unit for periodically calculating road gradient in each calculating cycle, based on the vehicle speed and the first and second vehicle accelerations "A" and "A'",
wherein the electronic control unit comprises;
a road gradient calculating portion for calculating an acceleration corresponding value "Ggrad0" for estimated gradient value, based on a difference between the first vehicle acceleration "A" and the second vehicle acceleration "A'";
a first-limiting-value calculating portion for receiving information for detected vehicle speed from the vehicle speed sensor, and having a first map for relation between the vehicle speed and a limiting value for rate-of-change of road gradient, the first-limiting-value calculating portion calculating a first limiting value ($\alpha$up, $\alpha$down) corresponding to the detected vehicle speed based on the first map;
a first comparing portion for comparing the acceleration corresponding value "Ggrad0" with a first upper limit "Grad1(previous cycle)+$\alpha$up" and with a first lower limit "Grad1(previous cycle)–$\alpha$down" in order to correct the acceleration corresponding value "Ggrad0" to produce a first corrected value "Ggrad1", wherein the first upper limit "Grad1(previous cycle)+$\alpha$up" and the first lower limit "Grad1(previous cycle)–$\alpha$down" are calculated based on the first limiting value ($\alpha$up, $\alpha$down),
wherein the first upper limit "Grad1(previous cycle)+$\alpha$up" is produced as the first corrected value "Ggrad1", in the case that the acceleration corresponding value "Ggrad0" is larger than the first upper limit "Grad1(previous cycle)+$\alpha$up",
wherein the acceleration corresponding value "Ggrad0" is produced as the first corrected value "Ggrad1", in the case that the acceleration corresponding value "Ggrad0" is smaller than the first upper limit "Grad1(previous cycle)+$\alpha$up" but larger than the first lower limit "Grad1 (previous cycle)–$\alpha$down", and
wherein the first lower limit "Grad1(previous cycle)–$\alpha$down" is produced as the first corrected value "Ggrad1", in the case that the acceleration corresponding value "Ggrad0" is smaller than the first lower limit "Grad1 (previous cycle)–$\alpha$down".

11. The road gradient estimating system according to the claim 10, wherein the electronic control unit further comprises;
a second-limiting-value calculating portion for also receiving the information for the detected vehicle speed from the vehicle speed sensor, and having a second map for relation between the vehicle speed and a limiting value for the road gradient, the second-limiting-value calculating portion calculating a second limiting value corresponding to the detected vehicle speed based on the second map; and
a second comparing portion for comparing the first corrected value "Ggrad1" produced by the first comparing portion with a second upper limit "Gmax1" and with a second lower limit "Gmin1" in order to correct the first corrected value "Ggrad1" to produce a second corrected value "Ggrad2",
wherein the second upper limit "Gmax1" and the second lower limit "Gmin1" are calculated based on the second limiting value,
wherein the second upper limit "Gmax1" is produced as the second corrected value "Ggrad2", in the case that the first corrected value "Ggrad1" is larger than the second upper limit "Gmax1",
wherein the first corrected value "Ggrad1" is produced as the second corrected value "Ggrad2", in the case that the first corrected value "Ggrad1" is smaller than the second upper limit "Gmax1" but larger than the second lower limit "Gmin1", and
wherein the second lower limit "Gmin1" is produced as the second corrected value "Ggrad2", in the case that the first corrected value "Ggrad1" is smaller than the second lower limit "Gmin1".

12. The road gradient estimating system according to the claim 11, wherein the electronic control unit further comprises;
a third comparing portion for comparing the second corrected value "Ggrad2" produced by the second comparing portion with a third upper limit "Gmax2" and with a third lower limit "Gmin2" in order to correct the second corrected value "Ggrad2" to produce a third corrected value "Ggrad3",
wherein the third upper limit "Gmax2" and the third lower limit "Gmin2" are calculated based on information for road gradient memorized in a navigation system for the vehicle,
wherein the third upper limit "Gmax2" is produced as the third corrected value "Ggrad3", in the case that the second corrected value "Ggrad2" is larger than the third upper limit "Gmax2",
wherein the second corrected value "Ggrad2" is produced as the third corrected value "Ggrad3", in the case that the second corrected value "Ggrad2" is smaller than the third upper limit "Gmax2" but larger than the third lower limit "Gmin2", and
wherein the third lower limit "Gmin2" is produced as the third corrected value "Ggrad3", in the case that the second corrected value "Ggrad2" is smaller than the third lower limit "Gmin2".

13. A road gradient estimating system comprising:
a vehicle speed sensor mounted on a vehicle for detecting vehicle speed;
a first acceleration sensor mounted on the vehicle for detecting a first vehicle acceleration "A" in a vehicle longitudinal direction;
a second acceleration sensor mounted on the vehicle for detecting a second vehicle acceleration "A'" with respect to a road, on which the vehicle is currently traveling;
a navigation system mounted on the vehicle for memorizing information of legal speed for respective roads; and an electronic control unit for periodically calculating road gradient in each calculating cycle, based on the vehicle speed and the first and second vehicle accelerations "A" and "A'", wherein the electronic control unit comprises;

a road gradient calculating portion for calculating an acceleration corresponding value "Ggrad0" for estimated gradient value, based on a difference between the first vehicle acceleration "A" and the second vehicle acceleration "A'";

a first-limiting-value calculating portion for receiving the information of the legal speed from the navigation system and information for detected vehicle speed from the vehicle speed sensor, and having a first map for relation between the legal speed and a curvature radius of the road for a current position of the vehicle, in order to calculate a first limiting value (αup, αdown) for rate-of-change of road gradient based on the detected vehicle speed and the curvature radius obtained from the first map;

a first comparing portion for comparing the acceleration corresponding value "Ggrad0" with a first upper limit "Grad1(previous cycle)+αup" and with a first lower limit "Grad1(previous cycle)−αdown" in order to correct the acceleration corresponding value "Ggrad0" to produce a first corrected value "Ggrad1", wherein the first upper limit "Grad1(previous cycle)+αup" and the first lower limit "Grad1(previous cycle)−αdown" are calculated based on the first limiting value (αup, αdown), wherein the first upper limit "Grad1(previous cycle)+αup" is produced as the first corrected value "Ggrad1", in the case that the acceleration corresponding value "Ggrad0" is larger than the first upper limit "Grad1(previous cycle)+αup", wherein the acceleration corresponding value "Ggrad0" is produced as the first corrected value "Ggrad1", in the case that the acceleration corresponding value "Ggrad0" is smaller than the first upper limit "Grad1(previous cycle)+αup" but larger than the first lower limit "Grad1(previous cycle)−αdown", and wherein the first lower limit "Grad1(previous cycle)−αdown" is produced as the first corrected value "Ggrad1", in the case that the acceleration corresponding value "Ggrad0" is smaller than the first lower limit "Grad1(previous cycle)−αdown".

14. The road gradient estimating system according to the claim 13, wherein the electronic control unit further comprises;

a second-limiting-value calculating portion for also receiving the information of the legal speed from the navigation system, and having a second map for relation between the legal speed and a limiting value for the road gradient, the second-limiting-value calculating portion calculating a second limiting value corresponding to the detected legal speed based on the second map; and a second comparing portion for comparing the first corrected value "Ggrad1" produced by the first comparing portion with a second upper limit "Gmax1" and with a second lower limit "Gmin1" in order to correct the first corrected value "Ggrad1" to produce a second corrected value "Ggrad2", wherein the second upper limit "Gmax1" and the second lower limit "Gmin1" are calculated based on the second limiting value, wherein the second upper limit "Gmax1" is produced as the second corrected value "Ggrad2", in the case that the first corrected value "Ggrad1" is larger than the second upper limit "Gmax1", wherein the first corrected value "Ggrad1" is produced as the second corrected value "Ggrad2", in the case that the first corrected value "Ggrad1" is smaller than the second upper limit "Gmax1" but larger than the second lower limit "Gmin1", and wherein the second lower limit "Gmin1" is produced as the second corrected value "Ggrad2", in the case that the first corrected value "Ggrad1" is smaller than the second lower limit "Gmin1".

* * * * *